(12) United States Patent
Hoshino et al.

(10) Patent No.: US 12,199,539 B2
(45) Date of Patent: Jan. 14, 2025

(54) MOTOR CONTROL DEVICE, ELECTRIC VEHICLE, AND MOTOR CONTROL METHOD

(71) Applicant: Hitachi Astemo, Ltd., Hitachinaka (JP)

(72) Inventors: Katsuhiro Hoshino, Hitachinaka (JP); Takafumi Hara, Tokyo (JP); Takaya Tsukagoshi, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 145 days.

(21) Appl. No.: 17/916,707

(22) PCT Filed: Jan. 22, 2021

(86) PCT No.: PCT/JP2021/002146
§ 371 (c)(1),
(2) Date: Oct. 3, 2022

(87) PCT Pub. No.: WO2021/205710
PCT Pub. Date: Oct. 14, 2021

(65) Prior Publication Data
US 2023/0155533 A1 May 18, 2023

(30) Foreign Application Priority Data
Apr. 6, 2020 (JP) ................................. 2020-068103

(51) Int. Cl.
*H02P 27/08* (2006.01)
*B60L 50/51* (2019.01)
(Continued)

(52) U.S. Cl.
CPC .............. *H02P 27/08* (2013.01); *B60L 50/51* (2019.02); *H02M 7/493* (2013.01); *H02M 7/537* (2013.01);
(Continued)

(58) Field of Classification Search
CPC ............ H02P 27/08; H02P 6/10; H02P 6/182; H02P 25/22; H02P 5/00; H02P 29/50;
(Continued)

(56) References Cited

U.S. PATENT DOCUMENTS 7,239,061 B2 * 7/2007 Huang ................... H02K 17/12
318/811
9,166,511 B2 * 10/2015 Morii ........................ H02P 6/15
(Continued)

FOREIGN PATENT DOCUMENTS

JP 2011-151916 A 8/2011
JP 2014-03783 A 1/2014
(Continued)

OTHER PUBLICATIONS

International Search Report with English Translation and Written Opinion dated Apr. 20, 2021.

*Primary Examiner* — David Luo
(74) *Attorney, Agent, or Firm* — Foley & Lardner LLP

(57) ABSTRACT

An object of the present invention is to sufficiently suppress a vibration and noise generated in a motor. A motor control device includes a first inverter circuit and a second inverter circuit of a redundant system, the first inverter circuit and the second inverter circuit controlling a motor, and a control unit that controls the first inverter circuit and the second inverter circuit. The first inverter circuit converts the DC power into the AC power based on a PWM signal generated by using a first carrier signal. The second inverter circuit converts the DC power into the AC power based on a PWM signal generated by using a second carrier signal. The control unit shifts phases of the first carrier signal and the second carrier signal by using, as a reference, pulsation of an electromagnetic force caused by a magnetic circuit of the motor.

9 Claims, 13 Drawing Sheets

(51) Int. Cl.
*H02M 7/493* (2007.01)
*H02M 7/537* (2006.01)
*H02P 6/10* (2006.01)
*H02P 6/182* (2016.01)
*H02P 25/22* (2006.01)

(52) U.S. Cl.
CPC ............ *H02P 6/10* (2013.01); *H02P 6/182* (2013.01); *H02P 25/22* (2013.01)

(58) Field of Classification Search
CPC ............ B60L 50/51; B60L 2210/42; B60L 2240/427; B60L 2240/429; B60L 2240/526; B60L 2240/529; B60L 2270/142; B60L 2270/145; B60L 2270/147; B60L 3/0092; B60L 15/025; H02M 7/493; H02M 7/537; H02M 7/5395; H02M 7/53871

USPC ............ 318/801, 800, 799, 798, 767, 727
See application file for complete search history.

(56) References Cited

U.S. PATENT DOCUMENTS 9,602,040 B2 * 3/2017 Takahashi ............ B60L 50/16
11,011,952 B2 * 5/2021 Matsumoto ............ H02K 3/42
2015/0326166 A1 11/2015 Hayashi

FOREIGN PATENT DOCUMENTS

JP   2015-213407 A   11/2015
WO  WO 2018-087892 A1   5/2018

* cited by examiner

MOTOR CONTROL DEVICE, ELECTRIC VEHICLE, AND MOTOR CONTROL METHOD

TECHNICAL FIELD

The present invention relates to a motor control device, an electric vehicle, and a motor control method.

BACKGROUND ART

A control device that includes inverters of two systems corresponding to two sets of multiphase winding sets and controls energization to each winding set for a multiphase AC motor including the two sets of multiphase winding sets in a control device of a motor is known.

PTL 1 discloses a device as follows. The device includes inverters of two system and a control unit. The inverters of the two systems are provided electrically independently to correspond to two sets of multiphase winding sets that form a stator of a multiphase AC motor and apply a rotating magnetic field to a rotor, and output an AC voltage to the two sets of multiphase winding sets. The control unit controls a phase difference of the AC voltage applied to the two sets of multiphase winding sets. The control unit sets a control range including a reference phase difference capable of reducing a harmonic component of a specific order with respect to the phase difference and changes the phase difference in the control range based on required characteristics of the multiphase AC motor or so as to cause fluctuation in energization of the multiphase AC motor.

CITATION LIST

Patent Literature

PTL 1: JP 2015-213407 A

SUMMARY OF INVENTION

Technical Problem

The above-described device disclosed in PTL 1 cannot sufficiently suppress a vibration and noise generated in the motor.

Solution to Problem

According to the present invention, a motor control device includes a first inverter circuit and a second inverter circuit of a redundant system, the first inverter circuit and the second inverter circuit controlling a motor, and a control unit that controls the first inverter circuit and the second inverter circuit. The first inverter circuit converts the DC power into the AC power based on a PWM signal generated by using a first carrier signal. The second inverter circuit converts the DC power into the AC power based on a PWM signal generated by using a second carrier signal. The control unit shifts phases of the first carrier signal and the second carrier signal by using, as a reference, pulsation of an electromagnetic force caused by a magnetic circuit of the motor.

According to the present invention, there is provided a motor control method in a motor control device including a first inverter circuit and a second inverter circuit of a redundant system, the first inverter circuit and the second inverter circuit controlling a motor, and a control unit that controls the first inverter circuit and the second inverter circuit. The motor control method includes converting, by the first inverter circuit, the DC power into the AC power based on a PWM signal generated by using a first carrier signal, converting, by the second inverter circuit, the DC power into the AC power based on a PWM signal generated by using a second carrier signal, and shifting, by the control unit, the phases of the first carrier signal and the second carrier signal by using, as a reference, pulsation of an electromagnetic force caused by a magnetic circuit of the motor.

Advantageous Effects of Invention

According to the present invention, it is possible to suppress a vibration and noise generated in a motor.

DESCRIPTION OF EMBODIMENTS

Figure 1:
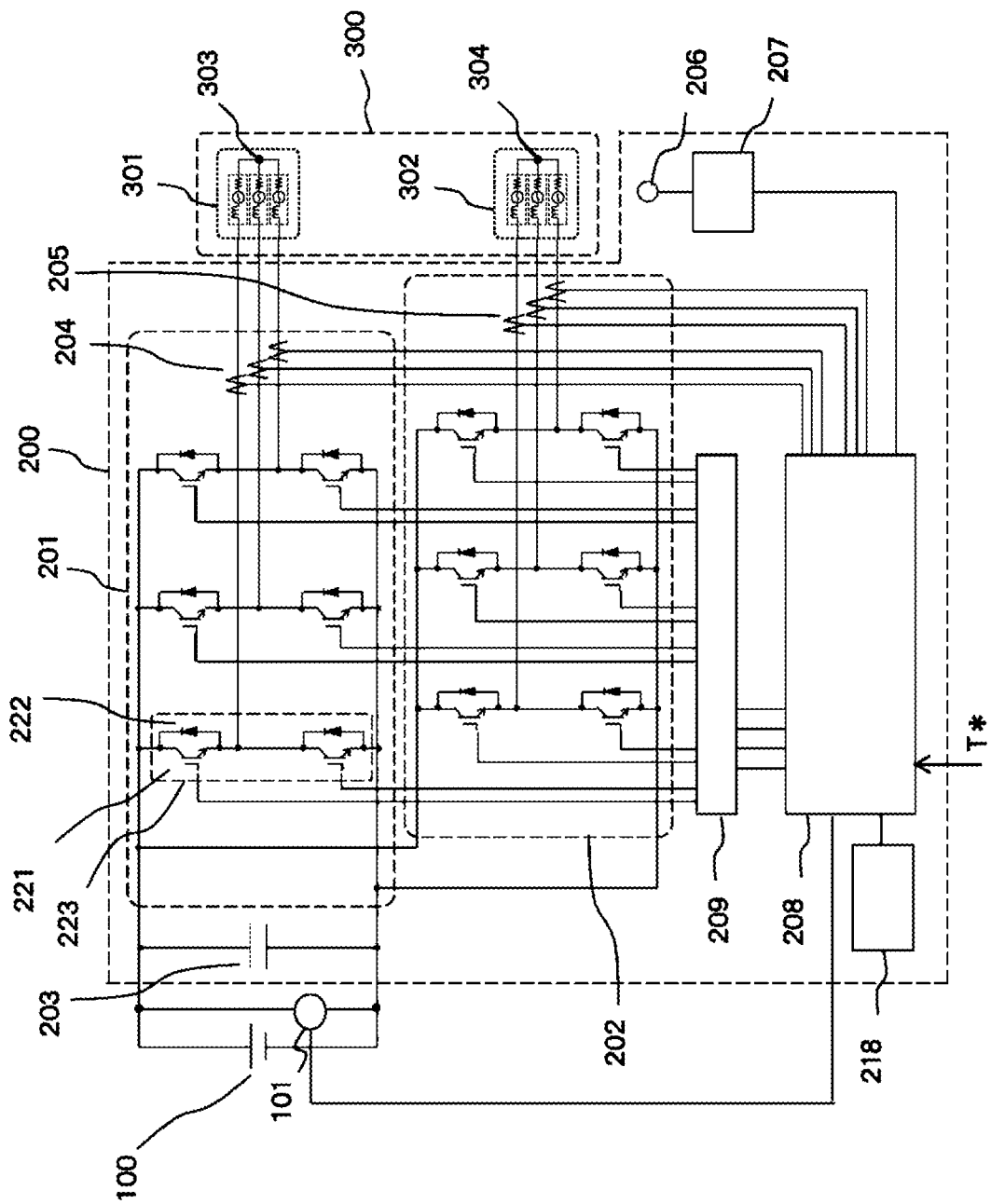
FIG. 1 is an overall configuration diagram of a motor drive system including a motor control device.

FIG. 1 is an overall configuration diagram of a motor drive system including a motor control device 200.

As illustrated in FIG. 1, the motor drive system includes a DC power source 100, the motor control device 200, and a motor 300. The motor control device 200 converts DC power supplied from the DC power source 100 into AC power to drive the motor 300. The DC power source 100 is mainly a secondary battery, and is a lithium ion battery or a nickel-metal hydride battery.

The motor control device 200 includes a first inverter circuit 201, a second inverter circuit 202, a smoothing capacitor 203, a first current sensor 204, a second current sensor 205, a magnetic pole position sensor 206, a magnetic pole position detector 207, a control unit 208, and a PWM signal drive circuit 209.

The first inverter circuit 201 includes switching elements respectively corresponding to upper arms and lower arms of a U-phase, a V-phase, and a W-phase. The switching element includes an IGBT 221 and a diode 222, and the upper arm and the lower arm are packaged together to form a power module 223. The switching element may be a metal oxide semiconductor field effect transistor (MOSFET). The first inverter circuit 201 forms a three-phase bridge circuit by using three power modules 223, and switches energization to each winding of a first-system winding set 301 of the motor 300. The power module 223 may include a total of six switching elements of upper and lower arms for three phases in one package.

The second inverter circuit 202 has a redundant system inverter configuration provided in parallel with the first inverter circuit 201 with respect to the DC power source 100 and the smoothing capacitor 203. Since the configuration of the second inverter circuit 202 is similar to that of the first inverter circuit 201, the description thereof will be omitted. The second inverter circuit 202 forms a three-phase bridge circuit by using a power module, and switches energization to each winding of a second-system winding set 302 of the motor 300.

The smoothing capacitor 203 suppresses pulsation of a voltage input from the DC power source 100 to the first inverter circuit 201 and the second inverter circuit 202 to perform smoothing. In the following description, the first inverter circuit 201 and the second inverter circuit 202 may be collectively referred to as inverter circuits 201 and 202. In addition, a voltage detector 101 detects a DC voltage value of the DC power source 100 and outputs the detected value to the control unit 208.

The first current sensor 204 is provided between an output line of the first inverter circuit 201 and the motor 300. The second current sensor 205 is provided between an output line of the second inverter circuit 202 and the motor 300. The first current sensor 204 detects first-system three-phase AC currents Iu1, Iv1, and Iw1 (U-phase AC current Iu1, V-phase AC current Iv1, and W-phase AC current Iw1) that energize the motor 300. The second current sensor 205 detects second-system three-phase AC currents Iu2, Iv2, and Iw2 (U-phase AC current Iu2, V-phase AC current Iv2, and W-phase AC current Iw2) that energize the motor 300.

The first current sensor 204 and the second current sensor 205 are configured by using, for example, a Hall current sensor or the like. Detection results of the two-system three-phase AC currents Iu1, Iv1, Iw1, Iu2, Iv2, and Iw2 by the first current sensor 204 and the second current sensor 205 are input to the control unit 208 and used for generation of a gate signal, which is performed by the control unit 208. In a double three-phase motor inverter, an example in which the first current sensor 204 and the second current sensor 205 are configured by three current sensors in each of the first system and the second system is shown. However, the number of current sensors may be set to two in each system, and an AC current of the remaining one phase may be calculated from the fact that the sum of the three-phase AC currents Iu, Iv, and Iw is zero. Further, a pulse-like DC current flowing from the DC power source 100 into the inverter circuits 201 and 202 is detected by a shunt resistor or the like inserted between the smoothing capacitor 203 and the inverter circuits 201 and 202. Then, the two-system three-phase AC currents Iu1, Iv1, Iw1, Iu2, Iv2, and Iw2 may be obtained based on the DC current and two-system three-phase AC voltages Vu1, Vv1, Vw1, Vu2, Vv2, and Vw2 applied from the inverter circuits 201 and 202 to the motor 300.

The magnetic pole position sensor 206 that detects the magnetic position θ is attached to the motor 300. The magnetic pole position sensor 206 is more preferably a resolver including an iron core and a winding, and may be a sensor using a Hall element or a magnetoresistive element such as a GMR, sensor.

A signal from the magnetic pole position sensor 206 is input to the magnetic pole position detector 207. The magnetic pole position detector 207 calculates the magnetic pole position θ from the input signal. The magnetic pole position detector 207 may estimate the magnetic position θ by using the two-system three-phase AC currents Iu1, Iv1, Iw1, Iu2, Iv2, and Iw2 flowing through the motor 300 or the two-system three-phase AC voltages Vu1, Vv1, Vw1, Vu2, Vv2, and Vw2 applied from the inverter circuits 201 and 202 to the motor 300 without using the input signal from the magnetic pole position sensor 206.

The control unit 208 receives inputs of current values from the first current sensor 204 and the second current sensor 205 and the magnetic position θ from the magnetic pole position detector 207, and further receives an input of a torque command value corresponding to a target torque from a host controller or the like (not illustrated). The magnetic position θ is used in phase control of AC power, which is performed in a manner that the control unit 208 generates the gate signal in accordance with the phase of the induced voltage of the motor 300. The control unit 208 performs PWM control based on input information to generate a PWM signal for driving the motor 300, and outputs the PWM signal to the PWM signal drive circuit 209.

The PWM signal drive circuit 209 generates a gate signal for controlling each of the switching elements included in the first inverter circuit 201 and the second inverter circuit 202 based on the PWM signal input from the control unit 208. Then, the PWM signal drive circuit 209 outputs the gate signal to the inverter circuits 201 and 202.

In the inverter circuits 201 and 202, each of the switching elements is controlled in accordance with the gate signal input from the PWM signal drive circuit 209, so that DC power supplied from the DC power source 100 is converted into AC power and output to the motor 300. The smoothing capacitor 203 smooths the DC power supplied from the DC power source 100 to the inverter circuits 201 and 202.

The motor 300 is a synchronous motor rotationally driven by AC power supplied from the inverter circuits 201 and 202, and includes a stator and a rotor. The stator of the motor 300 is provided with two-system three-phase windings being the first-system winding set 301 and the second-system winding set 302. AC power is input from the first inverter circuit 201 to the first-system winding set 301, three-phase AC currents Iu1, Iv1, and Iw1 flow through the respective windings forming the first-system winding set 301, and an armature magnetic flux is generated in the respective windings.

Similarly, AC power is input from the second inverter circuit 202 to the second-system winding set 302, three-phase AC currents Iu2, Iv2, and Iw2 flow through the respective windings forming the second-system winding set 302, and an armature magnetic flux is generated in the respective windings. Torque is generated in the rotor by generating an attraction force and a repulsive force between the combined magnetic flux of the armature magnetic flux generated in each of the windings of the two systems and the magnet magnetic flux of a permanent magnet arranged in the rotor. Thus, the rotor is rotationally driven.

Although FIG. 1 illustrates one control unit 208 and one PWM signal drive circuit 209, each of the inverter circuits 201 and 202 may include one control unit 208 including a PWM signal drive circuit. Furthermore, each of the inverter circuits 201 and 202 may have a PWM signal drive circuit 209 and a control unit 208.

The control unit 208 receives the torque command value T* from the host controller or the like (not illustrated), and calculates current phases of currents to be energized by the respective inverter circuits 201 and 202 of the first system and the second system based on the torque command value T*. Furthermore, the control unit 208 calculates a voltage command value so that the current energized by the inverter circuits 201 and 202 of the first system and the second system has a desired current phase. Then, the control unit 208 generates a PWM signal based on the three-phase current command value of each of the first system and the second system, and outputs the PWM signal to the PWM signal drive circuit 209. The PWM signal drive circuit 209 generates a gate signal based on the received PWM signal, and drives the switching elements of the inverter circuits 201 and 202.

In addition, a storage unit 218 that stores various maps is connected to the control unit 208. Although described in detail later, the control unit 208 shifts the phase of a PWM carrier signal used to generate a PWM signal for controlling the operation of each of the first inverter circuit 201 and the second inverter circuit 202 by using, a reference, the pulsation of an electromagnetic force caused by the magnetic circuit of the motor 300. At this time, processing is performed with reference to a map stored in the storage unit 218 in advance. The control unit 208 is, for example, a microcomputer. The storage unit 218 may be provided in the control unit 208.

Originally, it is ideal to drive the motor 300 with a sinusoidal current, but since the motor 300 that performs a variable speed operation needs to control the frequency of the current flowing from the inverter circuits 201 and 202 to the motor 300 in accordance with the rotational speed of the motor 300, most of the motors 300 that perform the variable speed operation are driven by the inverter circuits 201 and 202.

The PWM control performed by the control unit 208 is classified into two types by a difference in a control form of a frequency (carrier frequency) of the PWM carrier signal used to generate the PWM signal. Specifically, there are asynchronous PWM control in which the carrier frequency is constant regardless of the frequency of the current flowing through the motor 300, and synchronous PWM control in which the carrier frequency is controlled to be an integer multiple of the frequency of the current flowing through the motor 300. In a case where the motor 300 is driven to rotate at a high speed by using the asynchronous PWM control, the waveform of the current flowing through the motor 300 does not become a three-phase symmetrical waveform, which causes electromagnetic force pulsation of the motor 300. In a case where the synchronous PWM control is used, the waveform of the current flowing through the motor 300 becomes a three-phase symmetrical waveform. Thus, it is possible to expect an effect of reducing the electromagnetic force pulsation of the motor 300 as compared with the asynchronous PWM control.

The pulsation of the electromagnetic force generated by the motor 300 is a change in the electromagnetic force generated in the rotor by applying a current from the inverter circuits 201 and 202 to the motor 300. The pulsation of the electromagnetic force generated by the motor 300 is roughly divided into a torque ripple that is a pulsation component generated in a circumferential direction of the motor 300 and an electromagnetic excitation force that is a pulsation component generated in a radial direction of the motor 300. Two main causes of the pulsation of the electromagnetic force in the motor 300 are a change in the electromagnetic force generated depending on the shape of the motor magnetic circuit including the core of the stator of the motor 300, the coil of the stator, the core of the rotor, and the magnet of the rotor, and a change in the electromagnetic force generated by the harmonic wave included in the current applied from the inverter circuits 201 and 202 to the coil of the motor 300 due to the control of the inverter circuits 201 and 202.

Since the high-rotation motor 300 generally performs weak field control, the magnitude and the phase of pulsation of the electromagnetic force caused by the magnetic circuit vary even with the same torque. Furthermore, the magnitude of the weak field depends also on the DC voltage of the DC power source 100. The generation factor of the harmonic component included in the current applied from the inverter circuits 201 and 202 to the coil of the motor 300 is that the inverter circuits 201 and 202 are controlled by PWM control, and the voltage is applied not by a sine wave but by a PWM signal. The pulse amplitude of the PWM signal depends on the DC voltage.

Here, in the motor drive system in which the inverter circuits 201 and 202 of two systems are connected to the motor 300 including windings of two systems in which neutral points 303 and 304 are independent in a stator and the motor is driven, the pulsation of the electromagnetic force is determined by three factors of the pulsation of the electromagnetic force caused by the magnetic circuit of the motor 300 including the windings of two systems, the pulsation of the electromagnetic force caused by the control of the first inverter circuit 201, and the pulsation of the electromagnetic force caused by the control of the second inverter circuit 202.

Figure 2:
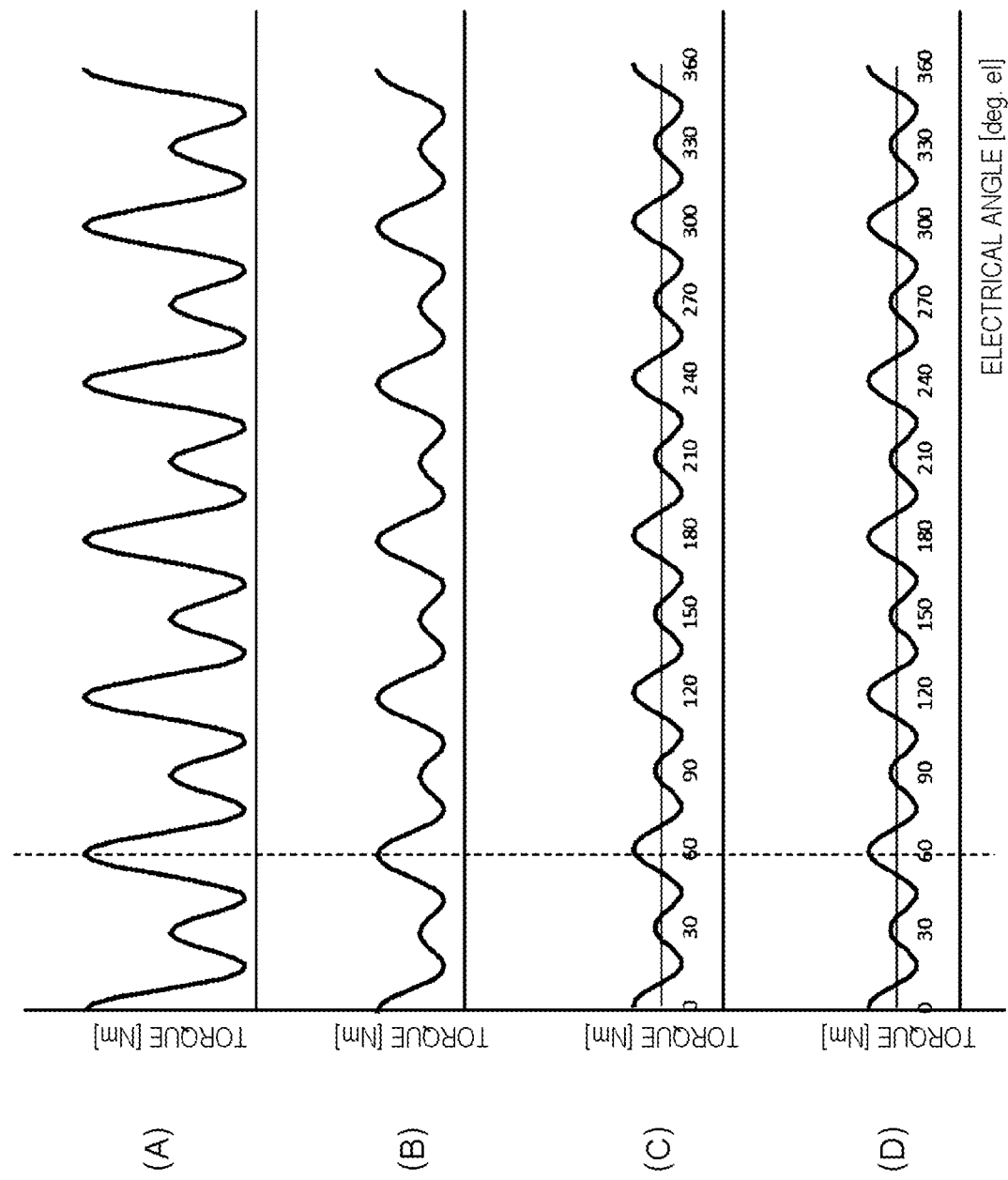
FIGS. 2(A), 2(B), 2(C), and 2(D) are diagrams illustrating torque ripples in a case where the present embodiment is not applied.

FIG. 2 is a diagram illustrating, as an example, a torque ripple that is a circumferential component of the pulsation of the electromagnetic force of the motor 300 in a case where the present embodiment is not applied. FIG. 2(A) is a diagram illustrating torque acting on the shaft of the motor 300. FIG. 2(B) is a diagram illustrating the circumferential component of the pulsation of the electromagnetic force caused by the magnetic circuit of the motor 300. FIG. 2(C) is a diagram illustrating the circumferential component of the pulsation of the electromagnetic force generated in the motor due to the control of the first inverter circuit 201. FIG. 2(D) is a diagram illustrating the circumferential component of the pulsation of the electromagnetic force generated in the motor due to the control of the second inverter circuit 202. The horizontal axis represents an electrical angle, and the vertical axis represents the torque. FIGS. 2(B), 2(C), and 2(D) illustrate the torque ripple being the circumferential component of the pulsation of the electromagnetic force due to each factor in the motor 300.

A torque ripple of the shaft of the motor 300 is generated as illustrated in FIG. 2(A) by adding the circumferential component of the pulsation of the electromagnetic force caused by the magnetic circuit of the motor 300 illustrated in FIG. 2(B), the circumferential component of the pulsation of the electromagnetic force caused by the control of the first inverter circuit 201 illustrated in FIG. 2(C), and the circumferential component of the pulsation of the electromagnetic force caused by the control of the second inverter circuit 202 illustrated in FIG. 2(D). This torque ripple becomes a vibration and noise of the motor 300.

Figure 3:
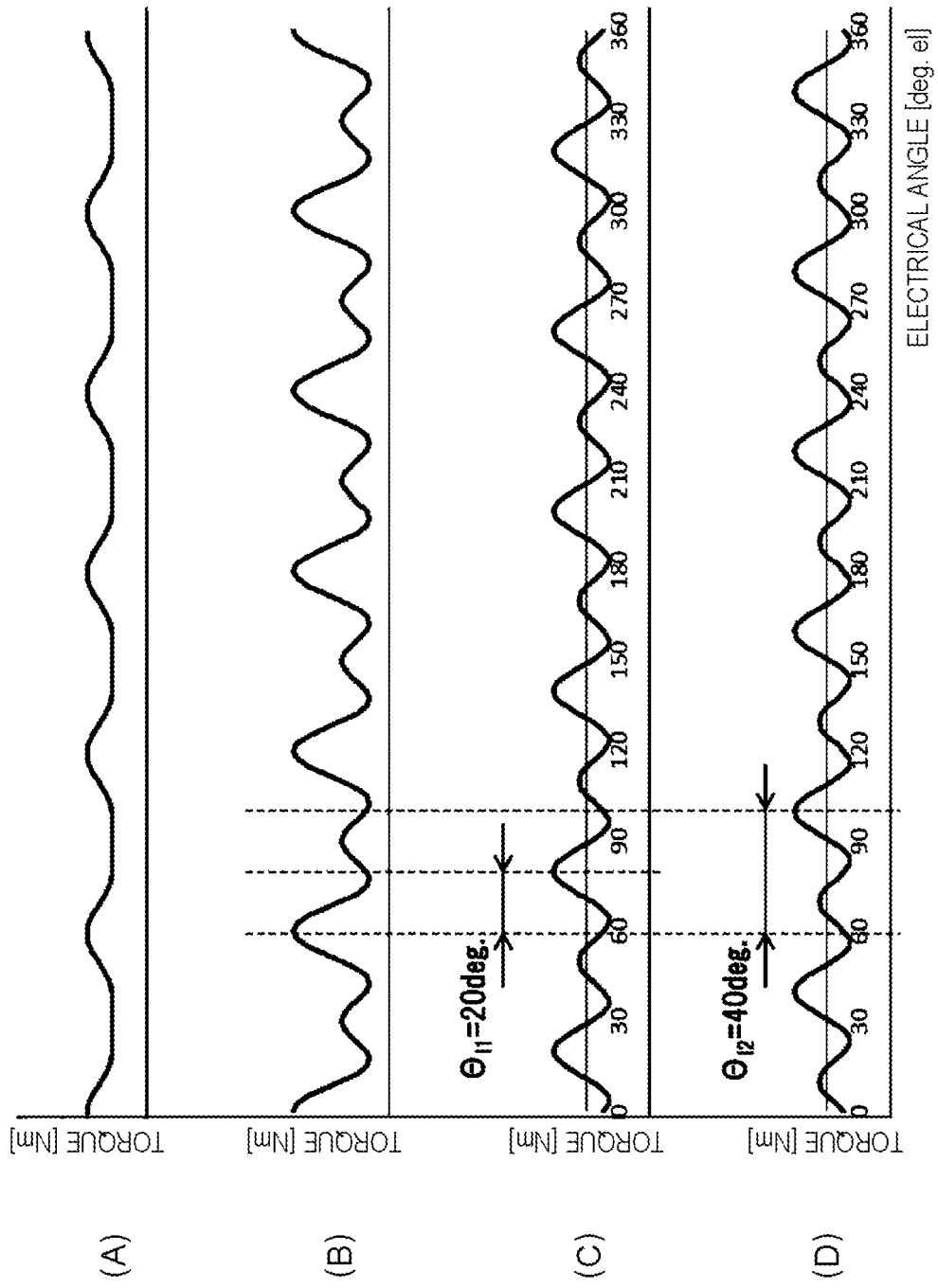
FIGS. 3(A), 3(B), 3(C), and 3(D) are diagrams illustrating torque ripples in a case where the present embodiment is applied.

FIG. 3 is a diagram illustrating, as an example, a torque ripple that is a circumferential component of the pulsation of the electromagnetic force of the motor 300 in a case where the present embodiment is applied. FIG. 3(A) is a diagram illustrating the torque of the shaft of the motor 300. FIG. 3(B) is a diagram illustrating the circumferential component of the pulsation of the electromagnetic force caused by the magnetic circuit of the motor 300. FIG. 3(C) is a diagram illustrating the circumferential component of the pulsation of the electromagnetic force caused by the control of the first inverter circuit 201. FIG. 3(D) is a diagram illustrating the circumferential component of the pulsation of the electromagnetic force caused by the control of the second inverter circuit 202. The horizontal axis represents an electrical angle, and the vertical axis represents the torque. Similarly to FIG. 2, FIGS. 3(B), 3(C), and 3(D) illustrate the torque ripple being the circumferential component of the pulsation of the electromagnetic force due to each factor in the motor 300.

In the present embodiment, the torque ripple finally generated by the motor 300 can be reduced by adjusting the phase of the pulsation of the electromagnetic force due to three factors by the control described later. Controllable elements in the pulsation of the electromagnetic force by the three elements are pulsation of the electromagnetic force caused by the control of the first inverter circuit 201 and pulsation of the electromagnetic force caused by the control of the second inverter circuit 202. The control unit 208 adjusts the phase $\theta_{T1}$ of the pulsation of the electromagnetic force caused by the control of the first inverter circuit 201 and the phase $\theta_{T2}$ of the pulsation of the electromagnetic force caused by the control of the second inverter circuit 202, by using, as a reference, the pulsation of the electromagnetic force caused by the magnetic circuit of the motor 300. The phase $\theta_{T1}$ of the pulsation of the electromagnetic force caused by the control of the first inverter circuit 201 is adjusted by adjusting the phase (carrier phase $\theta_{C1}$) of the PWM carrier signal used to generate the PWM signal for controlling the first inverter circuit 201. The phase $\theta_{T2}$ of the pulsation of the electromagnetic force caused by the control of the second inverter circuit 202 is adjusted by adjusting the phase (carrier phase $\theta_{C2}$) of the PWM carrier signal used to generate the PWM signal for controlling the second inverter circuit 202.

As illustrated in FIG. 3(C), for example, the pulsation of the electromagnetic force caused by the control of the first inverter circuit 201 is shifted by, for example, 20 degrees with respect to the pulsation of the electromagnetic force caused by the magnetic circuit of the motor 300 illustrated in FIG. 3(B). Furthermore, for example, the pulsation of the electromagnetic force caused by the control of the second inverter circuit 202 illustrated in FIG. 3(D) is shifted by, for example, 40 degrees with respect to the pulsation of the electromagnetic force caused by the magnetic circuit of the motor 300 illustrated in FIG. 3(B). As a result, as illustrated in FIG. 3(A), it is possible to suppress the pulsation generated in the torque of the shaft of the motor 300 and to suppress a vibration and noise of the motor 300.

In the above description, it has been described that the torque ripple, which is the circumferential component of the electromagnetic force pulsation generated in the motor 300, is reduced by adjusting the carrier phases $\theta_{C1}$ and $\theta_{C2}$ to adjust the phase $\theta_{T1}$ of the circumferential component in the electromagnetic force pulsation caused by the control of the first inverter circuit 201 and the phase $\theta_{T2}$ of the circumferential component in the electromagnetic force pulsation caused by the control of the second inverter circuit 202. Here, the electromagnetic excitation force that is a radial component of the electromagnetic force pulsation generated in the motor 300 can be similarly controlled. That is, it is possible to reduce the electromagnetic excitation force that is the radial component of the electromagnetic force pulsation generated in the motor 300 by adjusting the carrier phases $\theta_{C1}$ and $\theta_{C2}$ to adjust the phase of the radial component in the electromagnetic force pulsation caused by the control of the first inverter circuit 201 and the phase of the radial component in the electromagnetic force pulsation caused by the control of the second inverter circuit 202.

Figure 4:
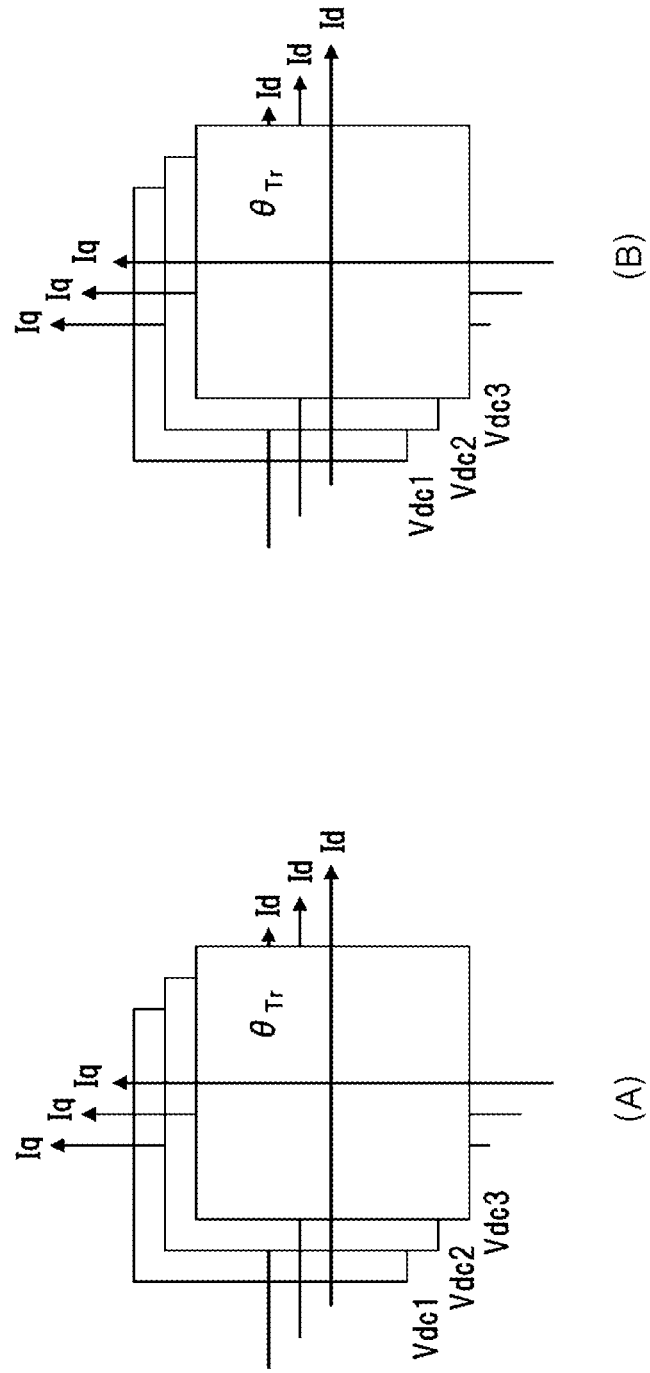
FIGS. 4(A) and 4(B) are diagrams illustrating motor pulsation maps.

FIGS. 4(A) and 4(B) are diagrams illustrating motor pulsation maps. FIG. 4(A) is a pulsation map of the electromagnetic force for the circumferential component of the motor 300, and FIG. 4(B) is a pulsation map of the electromagnetic force for the radial component of the motor 300. Both are stored in the storage unit 218 in advance.

As illustrated in FIG. 4(A), the pulsation map of the electromagnetic force for the circumferential component of the motor 300 is a map in which current command values Id and Iq at the time of controlling the motor 300 are associated with a phase $\theta_{Tr}$ of the pulsation of the electromagnetic force caused by the magnetic circuit of the motor 300. This map is set corresponding to each of DC voltages Vdc1, Vdc2, and Vdc3 of the DC power source 100. For easy description, FIG. 4(A) illustrates an example in which the motor pulsation map for the circumferential component is set for the three DC voltages Vdc1, Vdc2, and Vdc3. However, the motor pulsation map for the circumferential component only needs to be set corresponding to a plurality of DC voltages, and may be other than three.

As illustrated in FIG. 4(B), the pulsation map of the electromagnetic force for the radial component of the motor 300 is a map in which the current command values Id and Iq at the time of controlling the motor 300 are associated with the phase $\theta_{Tr}$ of the pulsation caused by the magnetic circuit of the motor 300. This map is set corresponding to each of DC voltages Vdc1, Vdc2, and Vdc3 of the DC power source 100. For easy description, FIG. 4(B) illustrates an example in which the motor pulsation map for the radial component is set for the three DC voltages Vdc1, Vdc2, and Vdc3. However, the motor pulsation map for the radial component only needs to be set corresponding to a plurality of DC voltages, and may be other than three.

The motor pulsation maps illustrated in FIGS. 4(A) and 4(B) are stored in advance by using experimental values and design values. For example, in the case of the DC voltage Vdc1 of the DC power source 100, the motor drive system illustrated in FIG. 1 is operated to obtain certain current command values Id and Iq and the phase $\theta_{Tr}$ of the pulsation of the electromagnetic force caused by the magnetic circuit of the motor 300, and thus to obtain a map. Then, the phase $\theta_{Tr}$ of each electromagnetic force pulsation is obtained by variously changing the current command values Id and Iq to obtain a map. Similarly, the DC voltage of the DC power source 100 is changed to obtain a map. In this case, which of the circumferential component and the radial component of the electromagnetic force pulsation is to be reduced is selected in accordance with the rotational speed of the motor 300. For example, in a case where the rotational speed of the motor 300 is low, the map for the circumferential component illustrated in FIG. 4(A) is used. In a case where the rotational speed of the motor 300 is high, the map for the radial component illustrated in FIG. 4(B) is used. In the motor pulsation map, the magnitude of pulsation of the electromagnetic force (torque ripple generated in the circumferential direction and electromagnetic excitation force generated in the radial direction) caused by the magnetic circuit of the motor 300 based on the current command values Id and Iq and a reference phase with respect to the electrical angle of the motor 300 are also stored in advance.

In a case where the control unit 208 refers to the map in the storage unit 218 and the rotational speed of the motor 300 is low, the phase $\theta_{Tr}$ of the electromagnetic force pulsation corresponding to the current command values Id and Iq is obtained with reference to the map for the circumferential component illustrated in FIG. 4(A). In a case where the rotational speed of the motor 300 is high, the phase of the electromagnetic force pulsation corresponding to the current command values Id and Iq is obtained with reference to the map for the radial component illustrated in FIG. 4(B).

Figure 5:
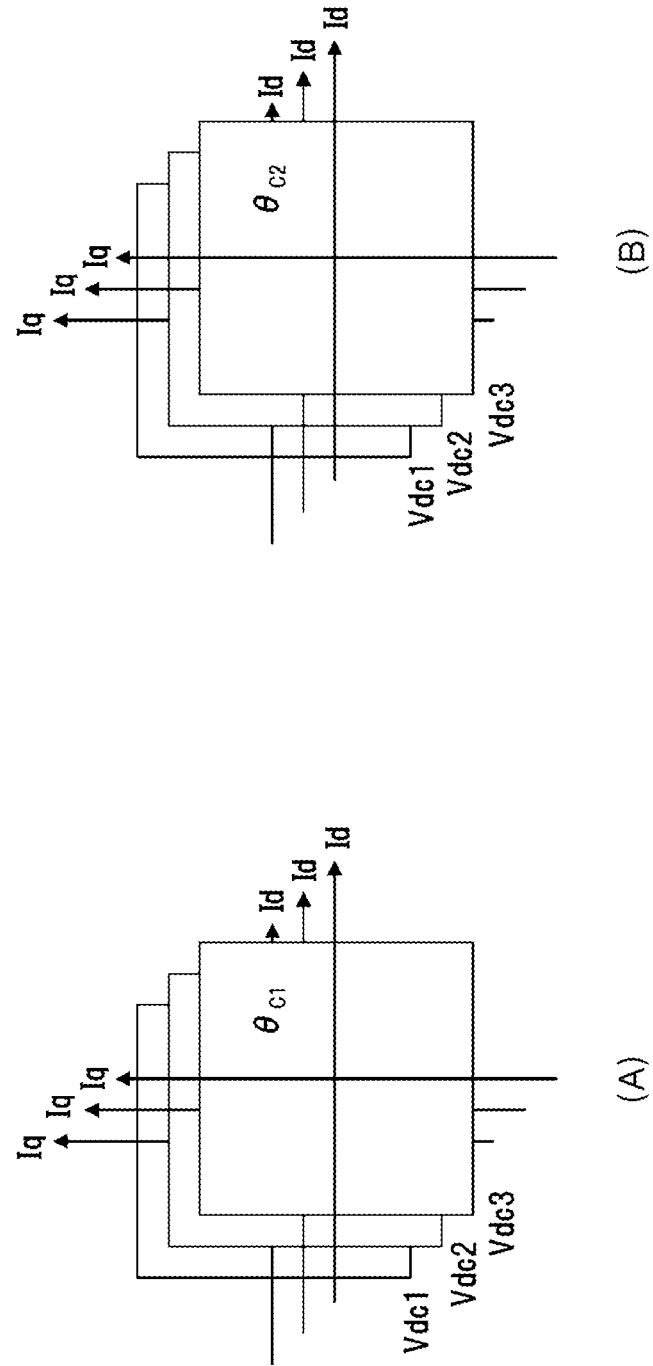
FIGS. 5(A) and 5(B) are diagrams illustrating circumferential carrier phase maps.

FIGS. 5(A) and 5(B) are diagrams illustrating the circumferential carrier phase map. FIG. 5(A) is a carrier phase map for a first circumferential component of the first inverter circuit 201, and FIG. 5(B) is a carrier phase map for a second circumferential component of the second inverter circuit 202. Both are stored in the storage unit 218 in advance.

As illustrated in FIG. 5(A), the carrier phase map for the first circumferential component of the first inverter circuit 201 is a map in which the current command values Id and Iq at the time of controlling the motor 300 are associated with a carrier phase $\theta_{C1}$ for reducing the circumferential component of the electromagnetic force pulsation caused by the control of the first inverter circuit 201. As illustrated in FIG. 5(B), the carrier phase map for the second circumferential component of the second inverter circuit 202 is a map in which the current command values Id and Iq at the time of controlling the motor 300 are associated with a carrier phase for reducing the circumferential component of the electromagnetic force pulsation caused by the control of the second inverter circuit 202. The map is set corresponding to each of DC voltages Vdc1, Vdc2, and Vdc3 of the DC power source 100. For convenience of description, FIGS. 5(A) and 5(B) illustrate an example in which the carrier phase map for the first circumferential component and the carrier phase map for the second circumferential component are respectively set for the three DC voltages Vdc1, Vdc2, and Vdc3, but the maps only needs to be set corresponding to a plurality of DC voltages and may be other than three.

Figure 6:
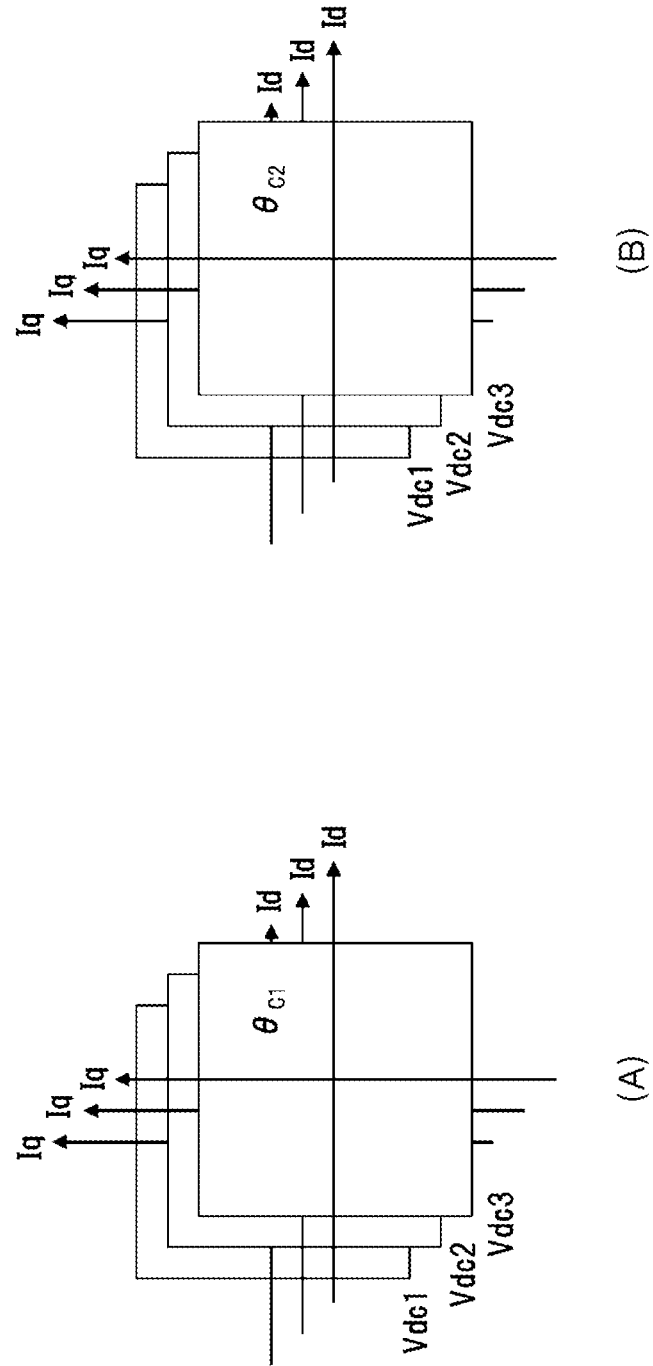
FIGS. 6(A) and 6(B) are diagrams illustrating radial carrier phase maps.

FIGS. 6(A) and 6(B) are diagrams illustrating the radial carrier phase map. FIG. 6(A) is a carrier phase map for a first radial component of the first inverter circuit 201, and FIG. 6(B) is a carrier phase map for a second radial component of the second inverter circuit 202. Both are stored in the storage unit 218 in advance.

As illustrated in FIG. 6(A), the carrier phase map for the first radial component of the first inverter circuit 201 is a map in which the current command values Id and Iq at the time of controlling the motor 300 are associated with a carrier phase $\theta_{C1}$ for reducing the radial component of the electromagnetic force pulsation caused by the control of the first inverter circuit 201. As illustrated in FIG. 6(B), the carrier phase map for the second radial component of the second inverter circuit 202 is a map in which the current command values Id and Iq at the time of controlling the motor 300 are associated with a carrier phase $\theta_{C2}$ for reducing the radial component of the electromagnetic force pulsation caused by the control of the second inverter circuit 202. The map is set corresponding to each of DC voltages Vdc1, Vdc2, and Vdc3 of the DC power source 100. For convenience of description, FIGS. 6(A) and 6(B) illustrate an example in which the carrier phase map for the first radial component and the carrier phase map for the second radial component are respectively set for the three DC voltages Vdc1, Vdc2, and Vdc3, but the maps only needs to be set corresponding to a plurality of DC voltages and may be other than three.

The carrier phases $\theta_{C1}$ and $\theta_{C2}$ in the circumferential carrier phase maps of FIGS. 5(A) and 5(B) and the radial carrier phase maps of FIGS. 6(A) and 6(B) are represented by using, a reference, the phase $\theta_{Tr}$ in the motor pulsation maps of FIGS. 4(A) and 4(B). That is, a phase difference between the electromagnetic force pulsation caused by the magnetic circuit of the motor 300 and each PWM carrier signal for reducing the electromagnetic force pulsation caused by the control of each of the first inverter circuit 201 and the second inverter circuit 202 is represented by each of the circumferential carrier phase maps of FIGS. 5(A) and 5(B) and the radial carrier phase maps of FIGS. 6(A) and 6(B).

The PWM carrier phase maps of the circumferential components illustrated in FIGS. 5(A) and 5(B) are stored in advance by using experimental values and design values. For example, in the case of the DC voltage Vdc1 of the DC power source 100, the motor drive system illustrated in FIG. 1 is operated to obtain certain current command values Id and Iq and carrier phases $\theta_{C1}$ and $\theta_{C2}$ for reducing the circumferential component of the pulsation of the electromagnetic force caused by the control of the first inverter circuit 201 and the second inverter circuit 202, and to obtain a map. Specifically, the phase of the PWM carrier signal of the first inverter circuit 201 is shifted, and the phase when the torque ripple of the motor 300 becomes the smallest is obtained as the carrier phase $\theta_{C1}$. The same applies to the second inverter circuit 202. That is, if the phases of the PWM carrier signals used for the PWM control of the inverter circuits 201 and 202 are shifted to the phases $\theta_{C1}$ and $\theta_{C2}$, the pulsation of the electromagnetic force in the circumferential direction caused by the control can be minimized. Then, the current command values Id and Iq are variously changed, and the carrier phases $\theta_{C1}$ and $\theta_{C2}$ in each case are obtained and used as a map. Similarly, the DC voltage of the DC power source 100 is changed to obtain a map.

Similarly, the PWM carrier phase maps of the radial components illustrated in FIGS. 6(A) and 6(B) are stored in advance by using experimental values and design values. For example, in the case of the DC voltage Vdc1 of the DC power source 100, the motor drive system illustrated in FIG. 1 is operated to obtain certain current command values Id and Iq and carrier phases $\theta_{C1}$ and $\theta_{C2}$ for reducing the radial component of the pulsation of the electromagnetic force caused by the control of the first inverter circuit 201 and the second inverter circuit 202, and to obtain a map. Then, the current command values Id and Iq are variously changed, and the carrier phases $\theta_{C1}$ and $\theta_{C2}$ in each case are obtained and used as a map. Similarly, the DC voltage of the DC power source 100 is changed to obtain a map.

In a case where the rotational speed of the motor 300 is low, the map for the circumferential component illustrated in FIGS. 5(A) and 5(B) is used. In a case where the rotational speed of the motor 300 is high, the map for the radial component illustrated in FIGS. 6(A) and 6(B) is used.

In a case where the control unit 208 refers to the map in the storage unit 218 and the rotational speed of the motor 300 is low, the carrier phases $\theta_{C1}$ and $\theta_{C2}$ corresponding to the current command values Id and Iq are obtained with reference to the map for the circumferential component illustrated in FIGS. 5(A) and 5(B). In a case where the rotational speed of the motor 300 is high, the carrier phases $\theta_{C1}$ and $\theta_{C2}$ corresponding to the current command values Id and Iq is obtained with reference to the map for the radial component illustrated in FIGS. 6(A) and 6(B).

Next, the pulsation (electromagnetic excitation force) of the electromagnetic force in the radial direction caused by the magnetic circuit of the motor 300 will be described with reference to FIG. 7.

In a case where the motor 300 rotates at a high speed, the number of pulses/period decreases on the high speed rotation side. Thus, the synchronous PWM control is used in the present embodiment. In a case where the synchronous PWM control is used, the electromagnetic force pulsation in the radial direction caused by the magnetic circuit of the motor 300 and the electromagnetic force pulsation in the radial direction caused by the harmonic current caused by the control of the inverter circuits 201 and 202 can be superimposed regardless of the rotational speed of the motor 300.

Figure 7:
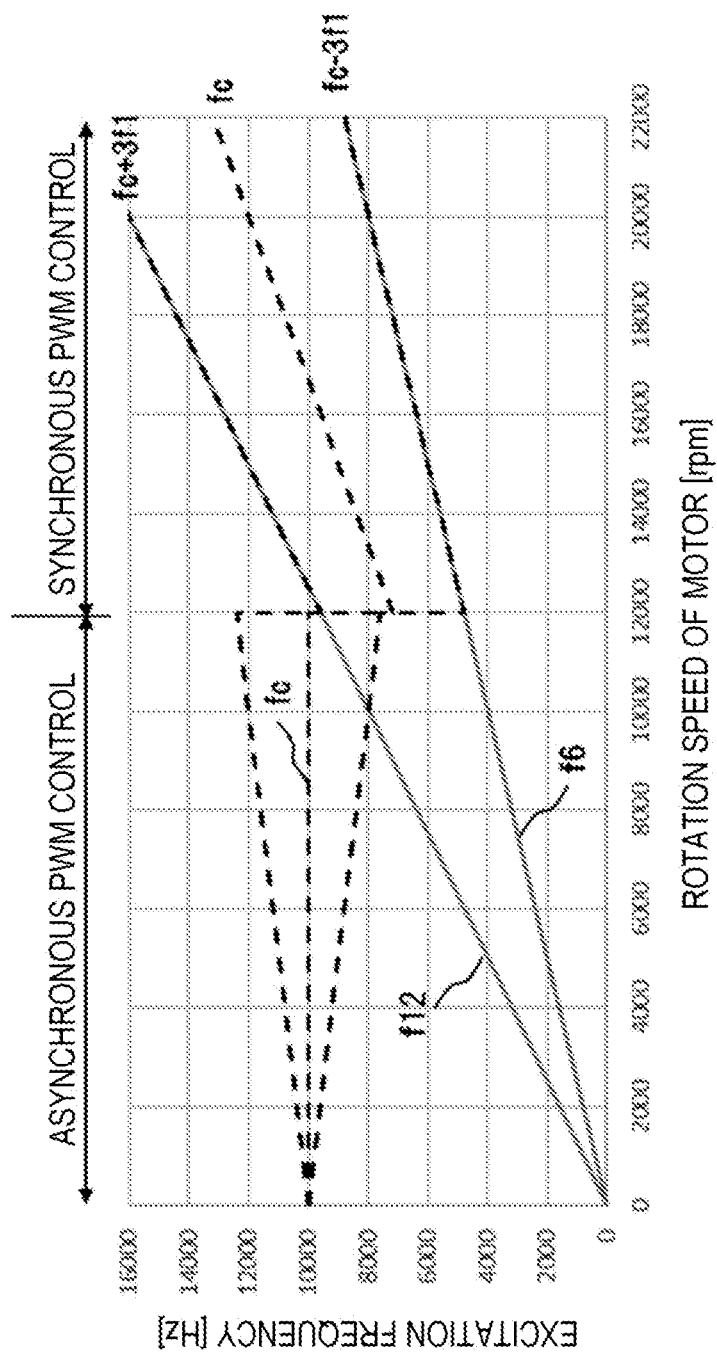
FIG. 7 is a diagram illustrating a relationship between a rotation speed of a motor and an excitation frequency.

FIG. 7 is a diagram illustrating a relationship between the rotation speed of the motor 300 and the excitation frequency (frequency of pulsation in the radial direction). The horizontal axis represents the rotation speed of the motor 300, and the vertical axis represents the excitation frequency.

The asynchronous PWM control is used until the rotation speed of the motor 300 reaches 12000 rpm, and the synchronous PWM control is used in a case where the rotation speed of the motor 300 exceeds 12000 rpm.

FIG. 7 illustrates an example in which the motor 300 is an 8-pole motor (the number of poles P=8). In the example of FIG. 7, the carrier frequency fc is 10 kHz in the asynchronous PWM control. In the synchronous PWM control, the carrier frequency fc is adjusted to form a PWM carrier signal of nine pulses for each cycle of the voltage command.

First, the excitation frequency caused by the magnetic circuit of the motor 300 will be described. An electrical angle (fundamental harmonic current) for turning the motor 300 is defined as a frequency f1 [Hz]. A relationship between the rotation speed N [rpm] of the motor 300 and the electrical angular frequency f1 is represented by the following Expression (1). P is the number of poles of the motor 300.

$$f1 = N/60 \times P/2 \text{[rpm]} \quad (1)$$

An excitation frequency f6 of the sixth order of rotation (electrical angle) of the motor 300 is represented by the following Expression (2). An excitation frequency f12 of the 12th order of the rotation (electrical angle) of the motor 300 is represented by the following Expression (3).

$$f6 = 6 \times f1 \text{[Hz]} \quad (2)$$

$$f12 = 12 \times f1 \text{[Hz]} \quad (3)$$

In FIG. 7, f6 illustrated is the excitation frequency f6 of the sixth order of rotation (electrical angle), and f12 illustrated is the excitation frequency f12 of the 12th order of rotation (electrical angle). As illustrated in FIG. 7, the excitation frequencies f6 and f12 linearly increase from a region of the asynchronous PWM control to a region of the synchronous PWM control. A carrier frequency fc is constant in the asynchronous PWM control.

Next, the excitation frequency (frequency of pulsation in the radial direction) by the harmonic current caused by the inverter circuits 201 and 202 will be described. The carrier frequency fc and the sideband component of fc±3f1 become the excitation frequency of the annular 0th order. The annular 0th order is the rotation order of pulsation in the radial direction of the motor 300. The component that is a radial component of the electromagnetic force generated in a gap of the motor 300 and uniformly changes with time in the radial direction is referred to as an annular 0th order mode. In the present embodiment, the pulsation of the electromagnetic force of the motor 300 in the radial direction is reduced for the annular 0th order radial pulsation.

In the case of the asynchronous PWM control, for example, when the rotation speed of the motor 300 is 6000 rpm, fc±3f1 is represented by the following Expressions (4) and (5).

$$fc+3f1 = 10000 + 3 \times 6000/60 \times 8/2 = 11200 \text{[Hz]} \quad (4)$$

$$fc-3f1 = 10000 - 3 \times 6000/60 \times 8/2 = 8800 \text{[Hz]} \quad (5)$$

In the case of the synchronous PWM control, assuming the PWM carrier signal of nine pulses for each cycle of the voltage command, the carrier frequency fc is represented by the following Expression (6). Therefore, the sideband components are represented by the following Expressions (7) and (8), respectively.

$$fc = 9 \times f1 \text{[Hz]} \quad (6)$$

$$fc+3f1 = 9 \times f1 + 3 \times f1 = 12 \times f1 \text{[Hz]} \quad (7)$$

$$fc-3f1 = 9 \times f1 - 3 \times f1 = 6' f1 \text{[Hz]} \quad (8)$$

As illustrated in FIG. 7, in the case of the synchronous PWM control, the frequencies f6 and f12 of the pulsation of the electromagnetic force in the radial direction caused by the magnetic circuit of the motor 300 overlap with the frequencies fc+3f1 and fc-3f1 of the pulsation of the electromagnetic force in the radial direction caused by the control of the inverter circuits 201 and 202. As described above, since the electromagnetic force pulsation in the radial direction caused by the magnetic circuit of the motor 300 and the electromagnetic force pulsation in the radial direction caused by the control of the inverter circuits 201 and 202 have the same frequency, it is possible to cancel the electromagnetic excitation force caused by the magnetic circuit of the motor 300 by shifting the phase of the electromagnetic force pulsation in the radial direction caused by the control of the inverter circuits 201 and 202 by the control to be described later.

Figure 8:
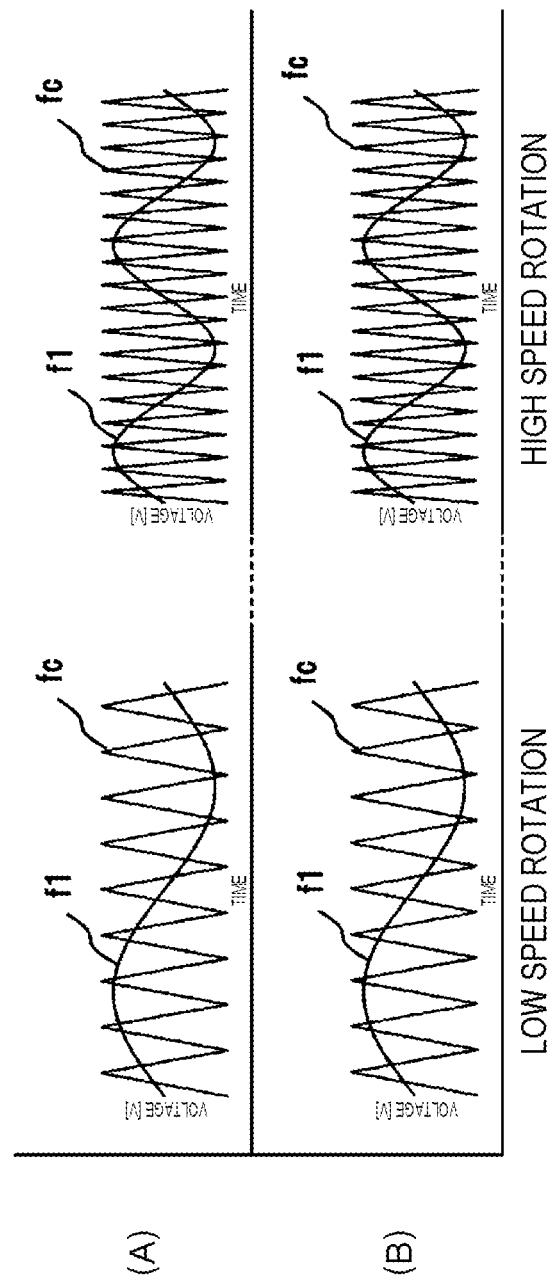
FIGS. 8(A) and 8(B) are diagrams illustrating a frequency of a voltage command and a carrier frequency fc.

FIG. 8 is a diagram illustrating the frequency of the voltage command and the carrier frequency fc. FIG. 8(A) illustrates a waveform by the first inverter circuit 201, and FIG. 8(B) illustrates a waveform by the second inverter circuit 202. The left of each drawing illustrates a case where the rotational speed of the motor 300 is low, and the right of each drawing illustrates a case where the rotational speed of the motor 300 is high.

The control of the control unit 208 illustrated in FIG. 1 is synchronous PWM control, and the control unit 208 controls the frequency of the voltage command and the carrier frequency fc. The frequency of the voltage command is a frequency f1[Hz] of an electrical angle (fundamental harmonic current) for turning the motor 300. As illustrated on the left of FIGS. 8(A) and 8(B), in the low speed rotation, the carrier frequency fc is controlled to form a PWM carrier signal of nine pulses for each cycle of the frequency f1 of the voltage command. As illustrated on the right side of FIGS. 8(A) and 8(B), the carrier frequency fc is similarly controlled to form a PWM carrier signal of nine pulses for each cycle of the frequency f1 of the voltage command even in the high speed rotation. The waveform by the first inverter circuit 201 and the waveform by the second inverter circuit 202 are similar waveforms. In this example, an example in which the PWM carrier signal of nine pulses is formed for each cycle of the frequency f1 of the voltage command has been described, but the frequency of the PWM carrier signal only needs to be an integer multiple of the frequency of the voltage command. In particular, it is preferable to perform control such that the integer multiple is an odd-numbered integer multiple or an integer multiple of a multiple of 3.

That is, the control unit 208 adjusts the carrier frequency fc such that the frequency of the PWM carrier signal used in the PWM control of each of the first inverter circuit 201 and the second inverter circuit 202 becomes an integer multiple of the frequency of the voltage command for driving the motor 300 in synchronization with the frequency f1 of the voltage command for driving the motor 300. By adjusting the carrier frequency in this manner, in a case where the synchronous PWM control is used, it is possible to superimpose the pulsation of the electromagnetic force caused by the magnetic circuit of the motor 300 and the pulsation of the electromagnetic force caused by the control of the inverter circuits 201 and 202, regardless of the rotational speed of the motor 300. Since both pulsations have the same frequency, it is possible to cancel the pulsation of the electromagnetic force caused by the magnetic circuit of the motor 300 by shifting the phase of the pulsation of the electromagnetic force caused by the control of the inverter circuits 201 and 202 by the control to be described later.

Figure 9:
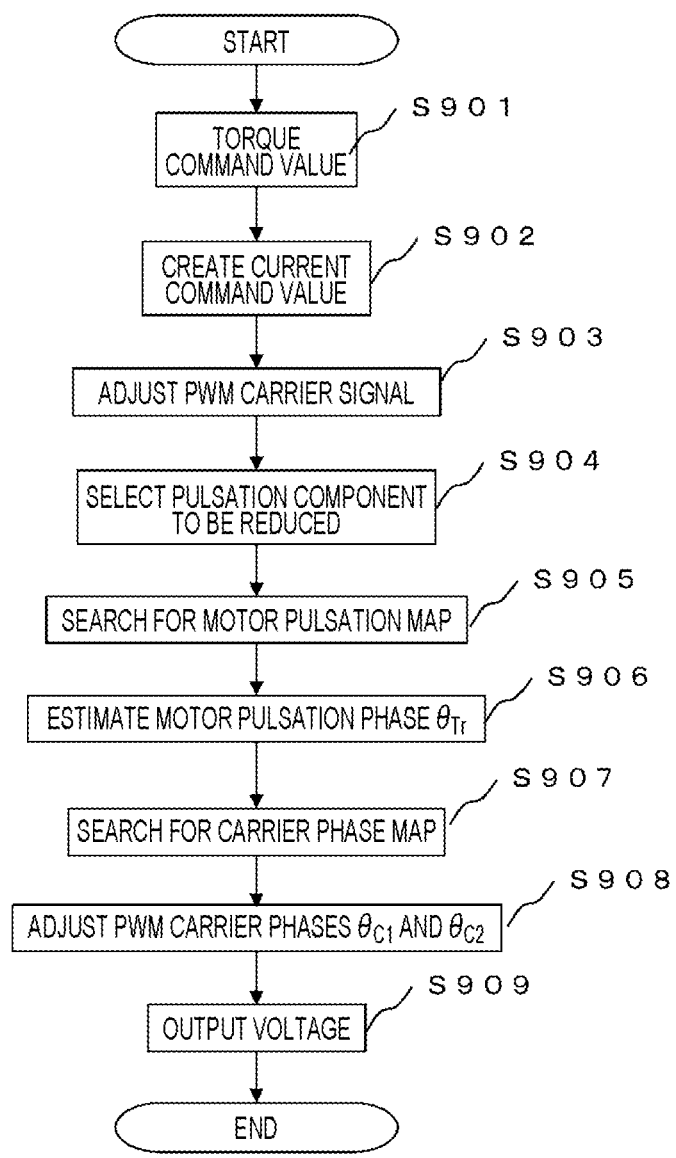
FIG. 9 is a flowchart illustrating processing of a control unit in the motor control device.

FIG. 9 is a flowchart illustrating processing of the control unit 208 in the motor control device 200.

The flowchart illustrated in FIG. 9 is performed at regular time intervals or every time the torque command value T* is input. A program illustrated in this flowchart can be executed by a computer including a CPU, a memory, and the like. All or a portion of the processing may be realized by a hard logic circuit. Furthermore, the program can be provided by being stored in advance in a storage medium of the motor control device 200. Alternatively, the program may be stored and provided in an independent storage medium, or the program may be recorded and stored in the storage medium of the motor control device 200 via a network line. Various forms of computer-readable computer program products, such as data signals (carrier waves), may be provided.

In Step S901 of FIG. 9, the control unit 208 receives a torque command value T* from the host controller or the like. Then, in Step S902, the control unit 208 creates current command values Id and Iq from the received torque command value T*.

Then, in Step S903, as described with reference to FIGS. 8(A) and 8(B), the control unit 208 adjusts the frequency of a PWM carrier signal to be an integer multiple of the frequency of a voltage command. At this time, for example, it is desirable to adjust the integer multiple to an odd-numbered integer multiple or an integer multiple of a multiple of 3.

Then, in Step S904, the control unit 208 selects a pulsation component to be reduced. That is, the circumferential component is selected in a case where the rotational speed of the motor 300 is lower than a predetermined value, and the radial component is selected in a case where the rotational speed of the motor 300 is equal to or greater than the predetermined value. The value of the rotational speed of the motor 300 is determined based on the rotation position θ from the magnetic pole position detector 207. In other words, the control unit 208 selects one of a torque ripple generated in the circumferential direction in the electromagnetic force pulsation caused by the magnetic circuit of the motor 300 and the electromagnetic excitation force generated in the radial direction in the electromagnetic force pulsation caused by the magnetic circuit of the motor 300, based on the rotational speed of the motor 300.

Then, in Step S905, the control unit 208 searches a motor pulsation map stored in the storage unit 218. As described above, the motor pulsation map includes the map for the circumferential component illustrated in FIG. 4(A) and the map for the radial component illustrated in FIG. 4(B). Since the pulsation component to be reduced is selected in Step S904, the map corresponding to the selected pulsation component is searched for. Prior to the search, the control unit 208 causes the voltage detector 101 to detect a DC voltage value of the DC power source 100. That is, in a case where the rotational speed is lower than the predetermined value, the map corresponding to the detected DC voltage value of the DC power source 100 among the maps for the three circumferential components illustrated in FIG. 4(A) is searched based on the current command values Id and Iq, and the phase $θ_{Tr}$ of the pulsation of the electromagnetic force caused by the magnetic circuit of the motor 300 is acquired. In a case where the rotational speed is equal to or greater than the predetermined value, the map corresponding to the detected DC voltage value of the DC power source 100 among the maps for the three radial components illustrated in FIG. 4(B) is searched based on the current command values Id and Iq, and the phase $θ_{Tr}$ of the pulsation of the electromagnetic force caused by the magnetic circuit of the motor 300 is acquired. In general, the amplitude of the pulsation of the electromagnetic force caused by the magnetic circuit of the motor 300 changes due to a change in the DC voltage of the DC power source 100. In the present embodiment, the map corresponding to the DC voltage value detected by the voltage detector 101 is referred to among the motor pulsation maps set in advance for the plurality of DC voltage values, and thus it is also possible to handle a change in amplitude.

In Step S906, the control unit 208 estimates the phase of the pulsation caused by the magnetic circuit of the motor 300 from the phase $θ_{Tr}$ searched in Step S905. Description will be made below with reference to FIG. 10.

Figure 10:
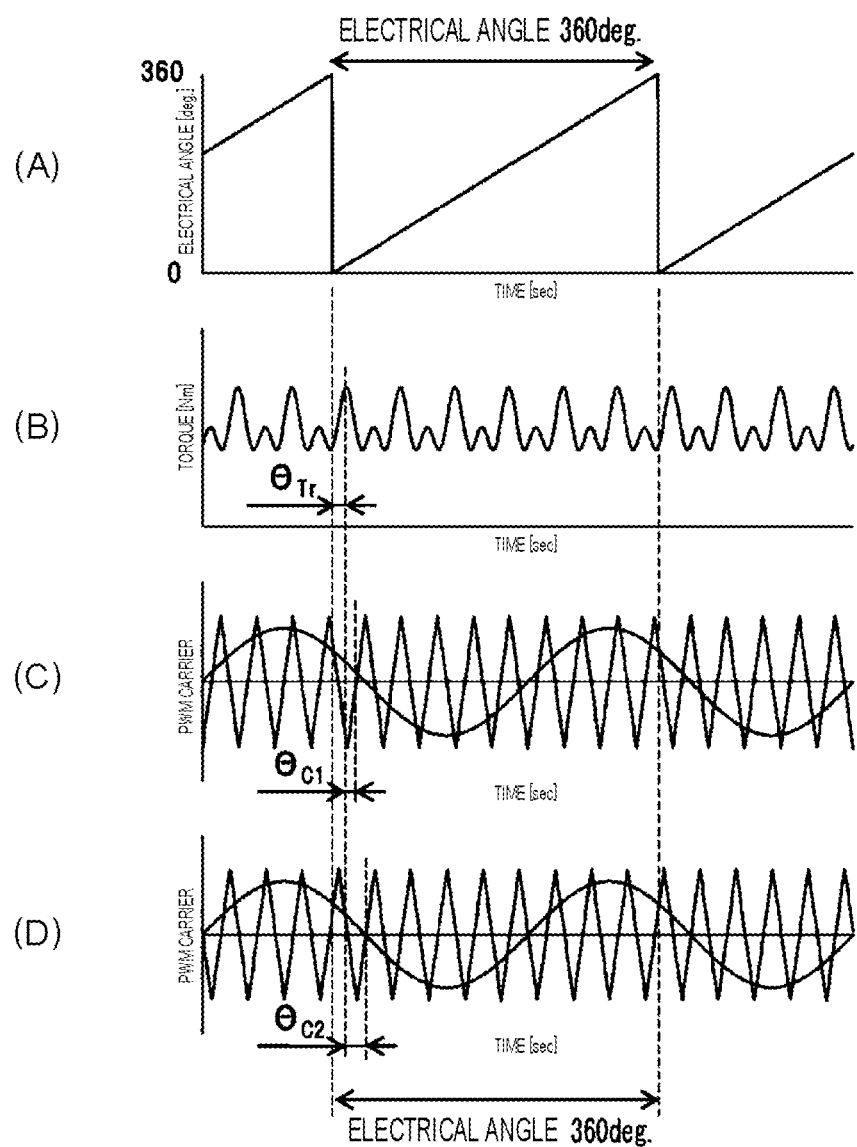
FIGS. 10(A), 10(B), 10(C), and 10(D) are diagrams illustrating torque ripples in a case where the present embodiment is applied.

FIG. 10 is a diagram illustrating a torque ripple in a case where the present embodiment is applied. FIG. 10(A) is a diagram illustrating the magnetic position of the motor 300. The horizontal axis represents time and the vertical axis represents an electrical angle. FIG. 10(B) illustrates the torque of the shaft of the motor 300. The horizontal axis represents time and the vertical axis represents torque. FIG. 10(C) is a diagram illustrating a PWM carrier signal and a voltage command of the first inverter circuit 201. FIG. 10(D) is a diagram illustrating a PWM carrier signal and a voltage command of the second inverter circuit 202. The horizontal axis represents time, and the vertical axis represents a voltage.

As illustrated in FIG. 10(A), the magnetic position of the motor 300 changes at every electrical angle of 360 degrees with the rotation of the motor 300, and the rotation angle of 0 degree is a reference position. As illustrated in FIG. 10(B), the pulsation of the electromagnetic force caused by the magnetic circuit of the motor 300 appearing in the torque of the shaft of the motor 300 is generated at a frequency of 6n times (n=6, 12, 18, per electrical angle cycle in the three-phase motor 300. Since the pulsation of the electromagnetic force caused by the magnetic circuit of the motor 300 is determined by the current command values Id and Iq, it is necessary to check the shift amount from the reference position of the motor 300.

The control unit 208 estimates the phase of the pulsation caused by the magnetic circuit of the motor 300 by using the detection signal of the magnetic pole position detector 207 attached to the motor 300 and the current command value to the motor 300. Since the pulsation of the electromagnetic force caused by the magnetic circuit with respect to the rotation angle of the motor 300 can be estimated, it is possible to adjust the carrier phases $\theta_{C1}$ and $\theta_{C2}$ as illustrated in FIGS. 10(C) and 10(D) by using this estimation as a reference as described later.

The description returns to the flowchart illustrated in FIG. 9.

In Step S907 of FIG. 9, the control unit 208 searches a carrier phase map stored in the storage unit 218. As described above, the carrier phase map includes the circumferential carrier phase map illustrated in FIGS. 5(A) and 5(B) and the radial carrier phase map illustrated in FIGS. 6(A) and 6(B).

Since the pulsation component to be reduced is selected in Step S904, the map corresponding to the selected pulsation component is searched for. Prior to the search, the control unit 208 causes the voltage detector 101 to detect a DC voltage value of the DC power source 100. That is, in a case where the rotational speed is lower than the predetermined value, the map corresponding to the detected DC voltage value of the DC power source 100 among the maps for the three circumferential components illustrated in FIGS. 5(A) and 5(B) is searched based on the current command values Id and Iq, and the carrier phases $\theta_{C1}$ and $\theta_{C2}$ are acquired. In a case where the rotational speed is equal to or greater than the predetermined value, the map corresponding to the detected DC voltage value of the DC power source 100 among the maps for the three radial components illustrated in FIGS. 6(A) and 6(B) is searched based on the current command values Id and Iq, and the carrier phases $\theta_{C1}$ and $\theta_{C2}$ are acquired.

In general, the amplitude of the pulsation of the electromagnetic force caused by the control of the inverter circuits 201 and 202 changes due to a change in the DC voltage of the DC power source 100. In the present embodiment, even though the amplitude of the pulsation of the electromagnetic force caused by the control of the inverter circuits 201 and 202 changes, it is possible to secure the effect of reducing the torque ripple and the electromagnetic excitation force when superimposed on the pulsation of the electromagnetic force caused by the magnetic circuit of the motor 300, by adjusting the phases. That is, the shift amount of the phase of the PWM carrier signal is adjusted based on the DC voltage value applied to the first inverter circuit 201 and the second inverter circuit 202 as described later.

In Step S908 of FIG. 9, the control unit 208 shifts the PWM carrier signal for the first inverter circuit 201 by the phase $\theta_{C1}$ by using, as a reference, the pulsation of the electromagnetic force caused by the magnetic circuit of the motor 300. Furthermore, the PWM carrier signal for the second inverter circuit 202 is shifted by the phase $\theta_{C2}$ by using, as a reference, the pulsation of the electromagnetic force caused by the magnetic circuit of the motor 300.

In Step S909, the control unit 208 drives the first inverter circuit 201 and the second inverter circuit 202 to output an AC voltage to the motor 300.

In this manner, the phase of the PWM carrier signal is shifted with reference to the pulsation of the electromagnetic force caused by the magnetic circuit of the motor 300 by the combined wave of the harmonic currents energized by the first inverter circuit and the second inverter circuit. As a result, it is possible to suppress pulsation caused by the magnetic circuit of the motor 300.

FIG. 3(C) illustrates an example in which the pulsation of the electromagnetic force caused by the control of the first inverter circuit 201 is shifted by 20 degrees. FIG. 3(D) illustrates an example in which the pulsation of the electromagnetic force caused by the control of the second inverter circuit 202 is shifted by 40 degrees. As described above, the phase $\theta_{r1}$ of the pulsation of the electromagnetic force caused by the control of the first inverter circuit 201 is adjusted by adjusting the carrier phase $\theta_{C1}$ of the first inverter circuit 201. The phase $\theta_{r2}$ of the pulsation of the electromagnetic force caused by the control of the second inverter circuit 202 is adjusted by adjusting the carrier phase $\theta_{C2}$ of the second inverter circuit 202. As a result, as illustrated in FIG. 3(A), it is possible to suppress the torque ripple generated in an axial direction of the motor 300 and the electromagnetic excitation force generated in the radial direction of the motor 300, and to suppress a vibration and noise of the motor 300.

In the present embodiment, the motor pulsation map illustrated in FIGS. 4(A) and 4(B), the circumferential carrier phase map illustrated in FIGS. 5(A) and 5(B), and the radial carrier phase map illustrated in FIGS. 6(A) and 6(B) are selected and used in accordance with the rotational speed of the motor 300. That is, one of the torque ripple generated in the circumferential direction of the pulsation caused by the magnetic circuit of the motor 300 and the electromagnetic excitation force generated in the radial direction of the pulsation caused by the magnetic circuit of the motor 300 is selected based on the rotational speed of the motor 300, and the phase of the PWM carrier signal is shifted to reduce the selected torque ripple or electromagnetic excitation force. As a result, which one of the torque ripple generated in the circumferential direction and the electromagnetic excitation force generated in the radial direction becomes the cause of the vibration is changed depending on the rotational speed of the motor 300, but it is possible to reduce the pulsation having the larger influence and to reduce the vibration.

In the present embodiment, the motor pulsation map illustrated in FIGS. 4(A) and 4(B), the circumferential carrier phase map illustrated in FIGS. 5(A) and 5(B), and the radial carrier phase map illustrated in FIGS. 6(A) and 6(B) are selected and used in accordance with the DC voltage value of the DC power source 100 detected by the voltage detector 101. That is, the shift amount of the phase of the PWM carrier signal is adjusted based on the DC voltage applied to the first inverter circuit 201 and the second inverter circuit 202. As a result, the amplitude of the pulsation of the electromagnetic force caused by the control of the first inverter circuit 201 and the second inverter circuit 202 changes due to the change in the DC voltage of the DC power source 100, but even though the amplitudes change, it is possible to secure the effect of reducing the torque ripple and the electromagnetic excitation force when superimposed on the pulsation of the electromagnetic force caused by the magnetic circuit of the motor 300.

Figure 11:
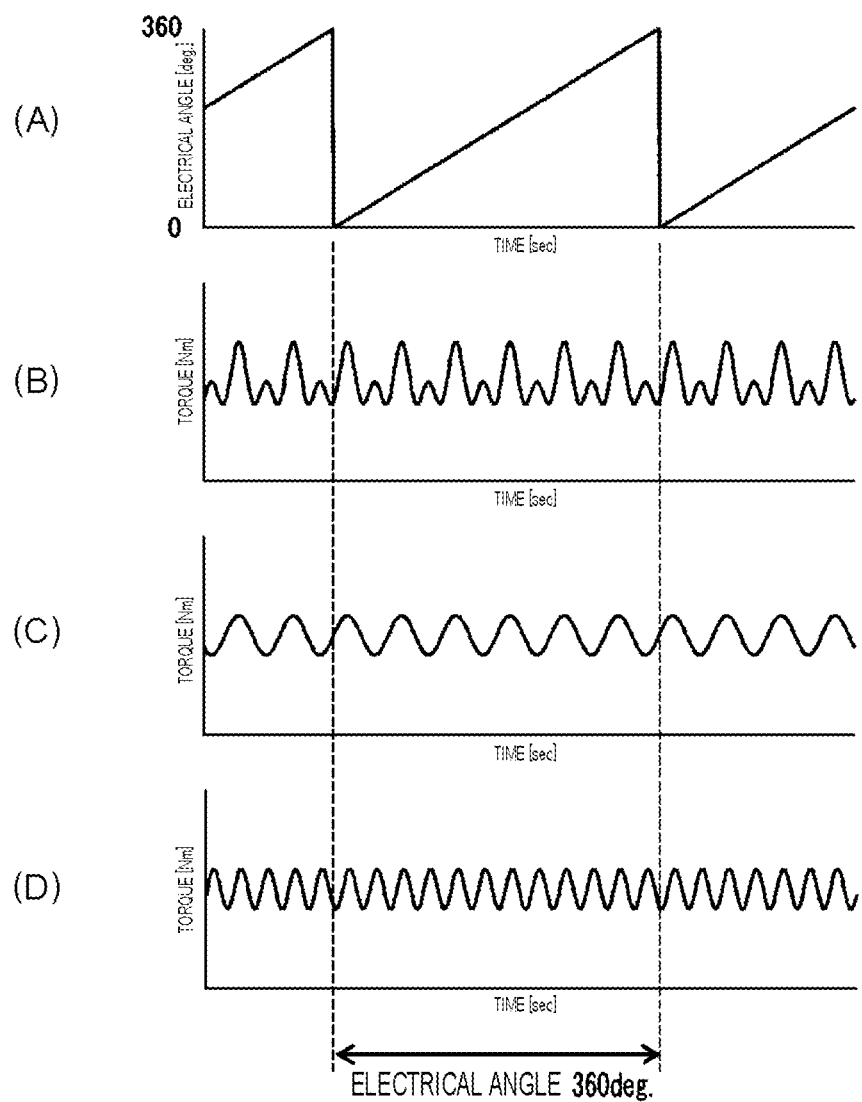
FIGS. 11(A), 11(B), 11(C), and 11(D) are diagrams illustrating rotation orders of pulsation in a case where the present embodiment is applied.

Next, the rotation order of the pulsation will be described with reference to FIG. 11.

FIG. 11(A) is a diagram illustrating the magnetic position of the motor 300. The horizontal axis represents time and the vertical axis represents an electrical angle. FIG. 11(B) illustrates the torque ripple of the shaft of the motor 300. The horizontal axis represents time and the vertical axis represents torque. FIG. 11(C) is a diagram illustrating an electrical angle sixth-order component of the torque ripple. FIG. 11(D) is a diagram illustrating an electrical angle 12th-order component of the torque ripple. The horizontal axis represents time, and the vertical axis represents torque.

The torque ripple of the shaft of the motor 300 illustrated in FIG. 11(B) indicates the pulsation of the electromagnetic force caused by the magnetic circuit of the motor 300. By referring to the magnetic pole position detector 403, it is possible to check how many degrees the rotor of the motor 300 is at in terms of electrical angle. The pulsation of the electromagnetic force caused by the magnetic circuit of the motor 300 illustrated in FIG. 11(B) is cut out by one electrical angle cycle (360 degrees) illustrated in FIG. 11(A) and component analysis is performed, and then results as illustrated in FIGS. 11(C) and 11(D) are obtained. That is, in the waveform of FIG. 11(C), there are six pulsations of the electromagnetic force in one electrical angle cycle (360 degrees). The pulsations occur 6 times with respect to one electrical angle rotation, which is referred to as an electrical angle sixth-order component. In the waveform of FIG. 11(D), there are 12 pulsations of the electromagnetic force in one electrical angle cycle (360 degrees), and the pulsations occur 12 times with respect to one electrical angle rotation, which is referred to as an electrical angle 12th-order component.

Figure 12:
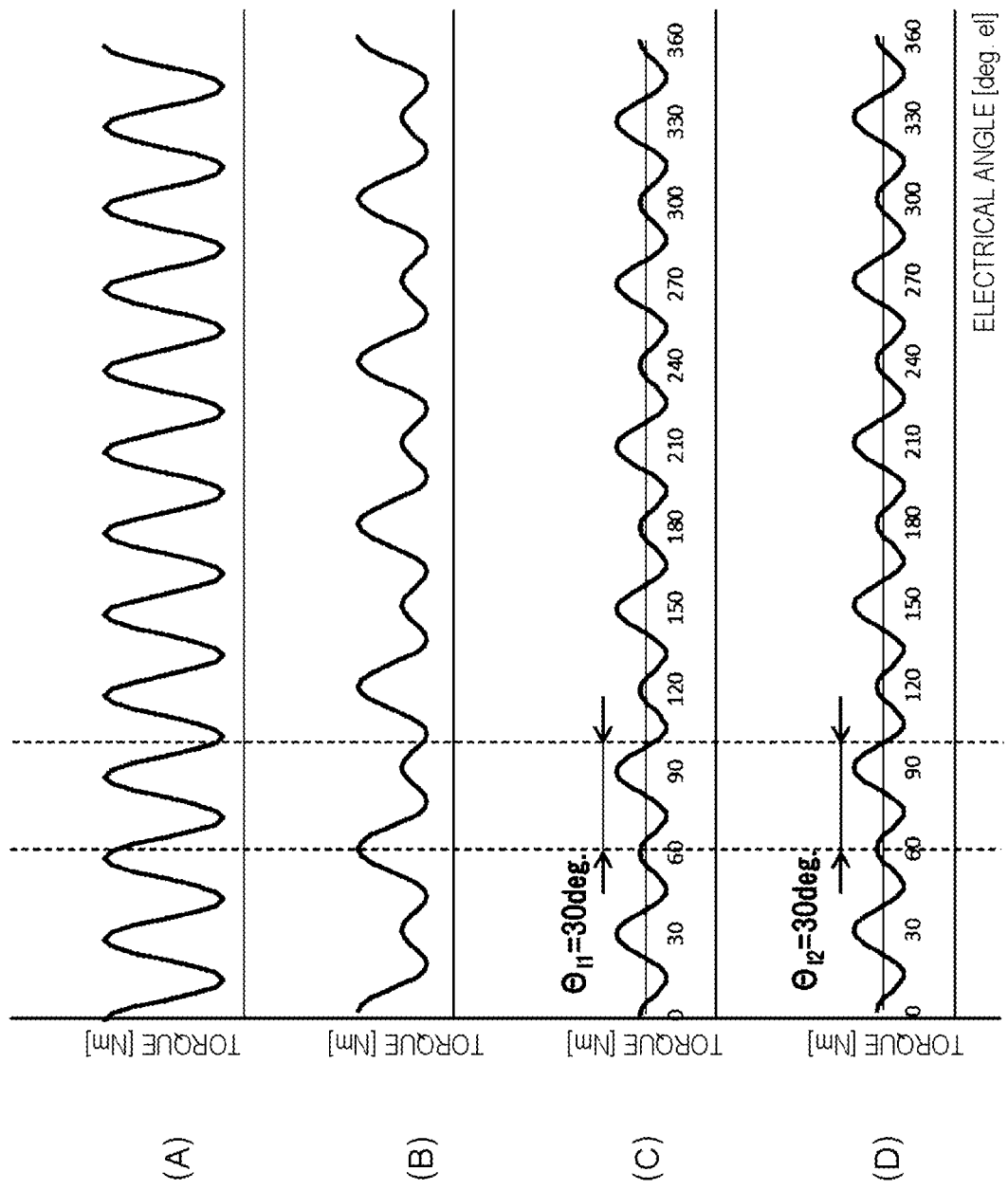
FIGS. 12(A), 12(B), 12(C), and 12(D) are views illustrating pulsation in a case where the present embodiment is applied.

Next, control for reducing the pulsation of the electromagnetic force of the electrical angle sixth-order component will be described. FIG. 12 is a diagram illustrating the pulsation in a case where the present embodiment is applied. FIG. 12(A) is a diagram illustrating the torque of the shaft of the motor 300. FIG. 12(B) is a diagram illustrating the pulsation of the electromagnetic force caused by the magnetic circuit of the motor 300. FIG. 12(C) is a diagram illustrating the pulsation of the electromagnetic force caused by the control of the first inverter circuit 201. FIG. 12(D) is a diagram illustrating the pulsation of the electromagnetic force caused by the control of the second inverter circuit 202. The horizontal axis represents an electrical angle, and the vertical axis represents the torque.

In the control for reducing the pulsation of the electromagnetic force of the electrical angle sixth-order component, the same processes as Steps S901 to S907 and S909 described with reference to FIG. 9 are executed, but the following processes are executed in Step S908 of FIG. 9.

As illustrated in FIG. 12(C), the control unit 208 shifts the phase $\theta_{f1}$ of the pulsation of the electromagnetic force caused by the control of the first inverter circuit 201 by 30 degrees by using, as a reference, the pulsation of the electromagnetic force caused by the magnetic circuit of the motor 300. Furthermore, as illustrated in FIG. 12(D), the control unit 208 shifts the phase $\theta_{f2}$ of the pulsation of the electromagnetic force caused by the control of the second inverter circuit 202 by 30 degrees by using, as a reference, the pulsation of the electromagnetic force due to the magnetic circuit of the motor 300.

As a result, as illustrated in FIG. 12(A), it is possible to reduce the electrical angle sixth-order component of the pulsation generated in the torque of the shaft of the motor 300 and to suppress a vibration and noise of the motor 300.

Next, control for reducing the pulsation of the electromagnetic forces of the electrical angle sixth-order component and the electrical angle 12th-order component will be described.

As described above, FIG. 3 is a diagram illustrating the pulsation of the electromagnetic force of the motor 300 in a case where the present embodiment is applied.

In the control for reducing the pulsation of the electromagnetic force of the electrical angle sixth-order component and the electrical angle 12th-order component, the same processes as Steps S901 to S907 and S909 described with reference to FIG. 9 are executed, but the following processes are executed in Step S908 of FIG. 9.

As illustrated in FIG. 3(C), the control unit 208 shifts the phase $\theta_{f1}$ of the pulsation of the electromagnetic force caused by the control of the first inverter circuit 201 by 20 degrees by using, as a reference, the pulsation of the electromagnetic force caused by the magnetic circuit of the motor 300. Furthermore, as illustrated in FIG. 3(D), the control unit 208 shifts the phase $\theta_{f2}$ of the pulsation of the electromagnetic force caused by the control of the second inverter circuit 202 by 40 degrees by using, as a reference, the pulsation of the electromagnetic force due to the magnetic circuit of the motor 300.

As a result, as illustrated in FIG. 3(A), it is possible to reduce the electrical angle sixth-order component and the electrical angle 12th-order component of the pulsation generated in the torque of the shaft of the motor 300 and to suppress a vibration and noise of the motor 300.

Figure 13:
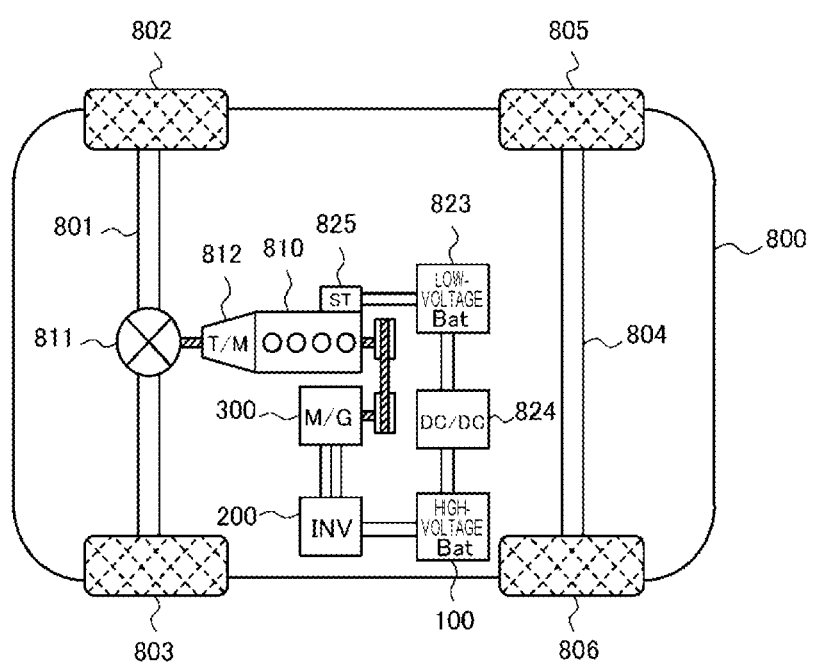
FIG. 13 is a configuration diagram of an electric vehicle system according to the present embodiment.

FIG. 13 is a configuration diagram of an electric vehicle system according to the present embodiment. As illustrated in FIG. 13, the electric vehicle system includes a power train in which the motor 300 is applied as a motor/generator, and travels by using a rotational driving force of the motor 300. The electric vehicle system will be described by using a hybrid system as an example.

In FIG. 13, a front wheel axle 801 is rotatably supported on a front portion of the electric vehicle 800, and front wheels 802 and 803 are provided at both ends of the front wheel axle 801. A rear wheel axle 804 is rotatably supported on a rear portion of the electric vehicle 800, and rear wheels 805 and 806 are provided at both ends of the rear wheel axle 804.

A differential gear 811 which is a power distribution mechanism is provided at a central portion of the front wheel axle 801, and a rotational driving force transmitted from an engine 810 via a transmission 812 is distributed to the left and right front wheel axles 801.

In the engine 810 and the motor 300, a pulley provided on a crankshaft of the engine 810 and a pulley provided on a rotation shaft of the motor 300 are mechanically joined via a belt. As a result, the rotational driving force of the motor 300 can be transmitted to the engine 810, and the rotational driving force of the engine 810 can be transmitted to the motor 300. In the motor 300, the three-phase AC power controlled by the motor control device 200 incorporating the inverter circuits 201 and 202 is supplied to the coil of the stator, so that the rotor rotates and generates a rotational driving force in corresponding to the three-phase AC power. The motor control device 200 is the device described above in the present embodiment.

That is, while the motor 300 is controlled by the motor control device 200 to operate as an electric motor, an electromotive force is induced in the coil of the stator by the rotation of the rotor by receiving the rotational driving force of the engine 810, and thus the motor operates as a generator that generates three-phase AC power.

The motor control device 200 is a power conversion device that converts DC power supplied from the DC power source 100 that is a high-voltage battery into three-phase AC power, and controls a three-phase AC current flowing through a stator coil of the motor 300, which corresponds to the magnetic position in accordance with an operation command value.

The three-phase AC power generated by the motor 300 is converted into DC power by the motor control device 200 to charge the DC power source 100. The DC power source 100 is electrically connected to a low-voltage battery 823 via a DC-DC converter 824. The low-voltage battery 823 constitutes a low-voltage (14 V) system power source of the electric vehicle 800, and is used as a power source of a starter 825 that initially starts (cold-starts) the engine 810, a radio, a light, or the like.

In general, regarding the vibration and the noise of the motor 300, the vibration noise is generated in a manner that an excitation force generated by an electromagnetic force is transmitted through the main body of the motor 300 and the attached structure and shakes each portion. In addition, in a case where the natural mode and the frequency of the structure overlap with the excitation mode of the excitation force, a resonance state occurs, and the vibration noise is amplified. In the present embodiment, it is possible to reduce a vibration and noise of the motor 300 and to further reduce a vibration and noise of the electric vehicle 800 on which the motor 300 is mounted.

According to the embodiment described above, the following operational effects can be obtained.

(1) A motor control device 200 includes a first inverter circuit 201 and a second inverter circuit 202 of a redundant system, the first inverter circuit 201 and the second inverter circuit 202 controlling a motor 300, and a control unit 208 that controls the first inverter circuit 201 and the second inverter circuit 202. The first inverter circuit 201 converts the DC power into the AC power based on a PWM signal generated by using a first carrier signal. The second inverter circuit 202 converts the DC power into the AC power based on a PWM signal generated by using a second carrier signal. The control unit 208 shifts phases of the first carrier signal and the second carrier signal by using, as a reference, pulsation of an electromagnetic force caused by a magnetic circuit of the motor 300. Thus, it is possible to suppress a vibration and noise generated in a motor.

(2) There is provided a motor control method in a motor control device 200 including a first inverter circuit 201 and a second inverter circuit 202 of a redundant system, the first inverter circuit 201 and the second inverter circuit 202 controlling a motor, and a control unit 208 that controls the first inverter circuit 201 and the second inverter circuit 202. The motor control method includes converting, by the first inverter circuit 201, the DC power into the AC power based on a PWM signal generated by using a first carrier signal, converting, by the second inverter circuit 202, the DC power into the AC power based on a PWM signal generated by using a second carrier signal, and shifting, by the control unit, the phases of the first carrier signal and the second carrier signal by using, as a reference, pulsation of an electromagnetic force caused by a magnetic circuit of the motor 300. Thus, it is possible to suppress a vibration and noise generated in a motor.

The present invention is not limited to the above-described embodiments, and other forms conceivable within the scope of the technical idea of the present invention are also included in the scope of the present invention as long as the characteristics of the present invention are not impaired.

REFERENCE SIGNS LIST

100 DC power source
101 voltage detector
200 motor control device
201 first inverter circuit
202 second inverter circuit
203 smoothing capacitor
204 first current sensor
205 second current sensor
206 magnetic pole position sensor
207 magnetic pole position detector
208 control unit
209 PWM signal drive circuit
223 power module
300 motor
301 first-system winding set
302 second-system winding set

The invention claimed is:

1. A motor control device comprising:
a first inverter circuit and a second inverter circuit of a redundant system, the first inverter circuit and the second inverter circuit controlling a motor; and
a control unit that controls the first inverter circuit and the second inverter circuit,
wherein the first inverter circuit converts the DC power into the AC power based on a PWM signal generated by using a first carrier signal,
the second inverter circuit converts the DC power into the AC power based on a PWM signal generated by using a second carrier signal, and
the control unit shifts phases of the first carrier signal and the second carrier signal by using, as a reference, pulsation of an electromagnetic force caused by a magnetic circuit of the motor,
wherein the control unit adjusts frequencies of the first carrier signal and the second carrier signal to an integer multiple of a frequency in a voltage command for driving the motor.

2. The motor control device according to claim 1, wherein the control unit shifts the phases of the first carrier signal and the second carrier signal such that a phase of pulsation of an electromagnetic force caused by control of the first inverter circuit and a phase of pulsation of an electromagnetic force caused by control of the second inverter circuit are respectively shifted, by a predetermined value, by using, as a reference, pulsation of the electromagnetic force caused by the magnetic circuit of the motor.

3. The motor control device according to claim 2, wherein the control unit shifts the phase of the first carrier signal and the second carrier signal to shift the phase of the pulsation of the electromagnetic force caused by the control of the first inverter circuit by 30 degrees, and to shift the phase of the pulsation of the electromagnetic force caused by the control of the second inverter circuit, by 30 degrees, by using, as a reference, the pulsation of the electromagnetic force caused by the magnetic circuit of the motor.

4. The motor control device according to claim 2, wherein the control unit shifts the phase of the first carrier signal and the second carrier signal to shift the phase of the pulsation of the electromagnetic force caused by the control of the first inverter circuit by 20 degrees, and to shift the phase of the pulsation of the electromagnetic force caused by the control of the second inverter circuit, by 40 degrees, by using, as a reference, the pulsation of the electromagnetic force caused by the magnetic circuit of the motor.

5. The motor control device according to claim 1, wherein the control unit
selects whether to reduce a torque ripple generated in a circumferential direction of the motor or reduce an electromagnetic excitation force generated in a radial direction of the motor based on a rotational speed of the motor, and
shifts the phases of the first carrier signal and the second carrier signal to a phase for reducing the torque ripple or the electromagnetic excitation force selected.

6. The motor control device according to claim 1, wherein the control unit estimates pulsation of the electromagnetic force caused by the magnetic circuit of the motor by using a detection signal of a magnetic pole position detector attached to the motor and a current command value to the motor.

7. An electric vehicle comprising:
the motor control device according to claim 1; and
the motor driven by the motor control device.

8. A motor control device, comprising:
a first inverter circuit and a second inverter circuit of a redundant system, the first inverter circuit and the second inverter circuit controlling a motor; and
a control unit that controls the first inverter circuit and the second inverter circuit,
wherein the first inverter circuit converts the DC power into the AC power based on a PWM signal generated by using a first carrier signal,
the second inverter circuit converts the DC power into the AC power based on a PWM signal generated by using a second carrier signal, and
the control unit shifts phases of the first carrier signal and the second carrier signal by using, as a reference, pulsation of an electromagnetic force caused by a magnetic circuit of the motor,
wherein the control unit shifts the phases of the first carrier signal and the second carrier signal based on DC voltage values applied to the first inverter circuit and the second inverter circuit.

9. A motor control method in a motor control device including a first inverter circuit and a second inverter circuit of a redundant system, the first inverter circuit and the second inverter circuit controlling a motor, and a control unit that controls the first inverter circuit and the second inverter circuit, the motor control method comprising:
converting, by the first inverter circuit, the DC power into the AC power based on a PWM signal generated by using a first carrier signal;
converting, by the second inverter circuit, the DC power into the AC power based on a PWM signal generated by using a second carrier signal;
shifting, by the control unit, the phases of the first carrier signal and the second carrier signal by using, as a reference, pulsation of an electromagnetic force caused by a magnetic circuit of the motor,
adjusting frequencies of the first carrier signal and the second carrier signal to an integer multiple of a frequency in a voltage command for driving the motor; and
shifting phases of the first carrier signal and the second carrier signal such that a phase of pulsation of an electromagnetic force caused by control of the first inverter circuit and a phase of pulsation of an electromagnetic force caused by control of the second inverter circuit are respectively shifted by predetermined values with reference to pulsation of an electromagnetic force caused by a magnetic circuit of the motor.

\* \* \* \* \*